United States Patent
Jalil et al.

(10) Patent No.: US 8,483,142 B2
(45) Date of Patent: Jul. 9, 2013

(54) METHOD AND APPARATUS FOR MANAGING BACKHAUL LINKS IN A COMMUNICATION NETWORK

(75) Inventors: Rehan Jalil, San Jose, CA (US); Mustafa Ergen, Oakland, CA (US)

(73) Assignee: WiChorus, Inc., Santa Clara, CA (US)

( * ) Notice: Subject to any disclaimer, the term of this patent is extended or adjusted under 35 U.S.C. 154(b) by 1046 days.

(21) Appl. No.: 12/025,773

(22) Filed: Feb. 5, 2008

(65) Prior Publication Data

US 2008/0186858 A1      Aug. 7, 2008

Related U.S. Application Data

(60) Provisional application No. 60/899,968, filed on Feb. 7, 2007.

(51) Int. Cl.
*H04W 4/00*      (2009.01)

(52) U.S. Cl.
USPC ........... 370/329; 370/229; 370/235; 709/223; 709/224; 709/225; 709/226; 709/227; 709/228; 709/229

(58) Field of Classification Search
USPC ........... 370/235–240, 310–350; 709/223–229
See application file for complete search history.

(56) References Cited

U.S. PATENT DOCUMENTS

| | | | |
|---|---|---|---|
| 5,491,719 A | 2/1996 | Sellin et al. | |
| 5,757,810 A * | 5/1998 | Fall | 714/704 |
| 5,959,971 A | 9/1999 | Sakai | |
| 5,982,760 A | 11/1999 | Chen | |
| 6,678,527 B1 * | 1/2004 | Rasanen | 455/450 |
| 6,697,352 B1 | 2/2004 | Ludwig et al. | |
| 6,748,220 B1 * | 6/2004 | Chow et al. | 455/450 |
| 6,865,165 B1 | 3/2005 | Huttunen | |
| 2001/0046839 A1 * | 11/2001 | Latva-Aho et al. | 455/3.05 |
| 2005/0037771 A1 | 2/2005 | Tiedemann et al. | |
| 2005/0043035 A1 | 2/2005 | Diesen et al. | |
| 2006/0045013 A1 * | 3/2006 | Vannithamby et al. | 370/231 |
| 2006/0126509 A1 * | 6/2006 | Abi-Nassif et al. | 370/235 |
| 2007/0177510 A1 * | 8/2007 | Natarajan et al. | 370/238 |
| 2007/0218910 A1 * | 9/2007 | Hill et al. | 455/445 |
| 2007/0275760 A1 * | 11/2007 | Lundh et al. | 455/560 |
| 2008/0008092 A1 * | 1/2008 | Wang et al. | 370/235 |
| 2008/0085722 A1 | 4/2008 | Hirano et al. | |
| 2008/0123645 A1 * | 5/2008 | Pichna et al. | 370/390 |
| 2008/0176575 A1 | 7/2008 | Sutton | |
| 2008/0268864 A1 * | 10/2008 | Andersson et al. | 455/453 |

* cited by examiner

*Primary Examiner* — Charles C Jiang

(74) *Attorney, Agent, or Firm* — Hamilton, Brook, Smith & Reynolds, P.C.

(57) ABSTRACT

A method and apparatus for managing communication in a communication network is provided. The method includes obtaining traffic information from one or more Base Stations (BSs). The traffic information of a BS corresponds to a traffic condition over one or more interfaces between the BS and a plurality of Mobile Stations (MSs) communicating with the BS. The method further includes controlling traffic in one or more backhaul links based on the traffic information obtained from one or more BS.

14 Claims, 4 Drawing Sheets

METHOD AND APPARATUS FOR MANAGING BACKHAUL LINKS IN A COMMUNICATION NETWORK

RELATED APPLICATIONS

Benefit is claimed under 35 U.S.C. 119(e) to U.S. Provisional Application Ser. No. 60/899,968 entitled "Back haul link utilization for maximum wireless channel efficiency with feedback" by Mustafa Ergen et al., filed on 7 Feb. 2007, which is herein incorporated in its entirety by reference for all purposes.

FIELD OF THE INVENTION

The invention generally relates to a communication network. More specifically, the invention relates to a method and apparatus for managing backhaul links in a communication network. Examples of the communication network may include, but are not limited to, Worldwide Interoperability for Microwave Access (WiMAX) communication network, 3rd Generation Partnership Project (3GPP) network including 3GPP Long Term Evolution (LTE) network, 3rd Generation Partnership Project 2 (3GPP2) network including 3GPP2 Ultra Mobile Broadband (UMB) network, as well as Wireless Fidelity (WiFi) network, and any variant of Orthogonal Frequency Division Multiple Access (OFDMA) communication network having a backhaul link.

BACKGROUND OF THE INVENTION

In a communication network, a plurality of Base Stations (BSs) use one or more backhaul links for availing wireless communication services. The plurality of BS further provide these wireless communication services to a plurality of Mobile Stations (MSs). For example, in a Worldwide Interoperability for Microwave Access (WiMAX) communication network, an Access Service Network (ASN) includes one or more ASN-Gateways (ASN-GWs) and a plurality of BSs. Each ASN-GW communicates with one or more BSs in the ASN through a backhaul link for providing Internet Protocol (IP) connectivity. In a WiMAX communication network the backhaul link is an R6 link.

Further, in a WiMAX communication network, one or more MSs communicate with their corresponding BS through an R1 link. A cell of a BS may be divided into a plurality of sectors. In such case, each sector of the BS has a separate R1 link for communicating with the corresponding MSs. Traffic in the R1 link between the BS and the corresponding MSs varies due to change in capacity of the BS. The capacity of the BS changes due to change in modulation rate of signals communicated through the R1 link. If the data traffic is more in a backhaul link for a sector of a BS which operates at a lower capacity, then the data will be buffered and dropped in the BS. Therefore, the backhaul link is not optimally used; as a result, usage cost is increased.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
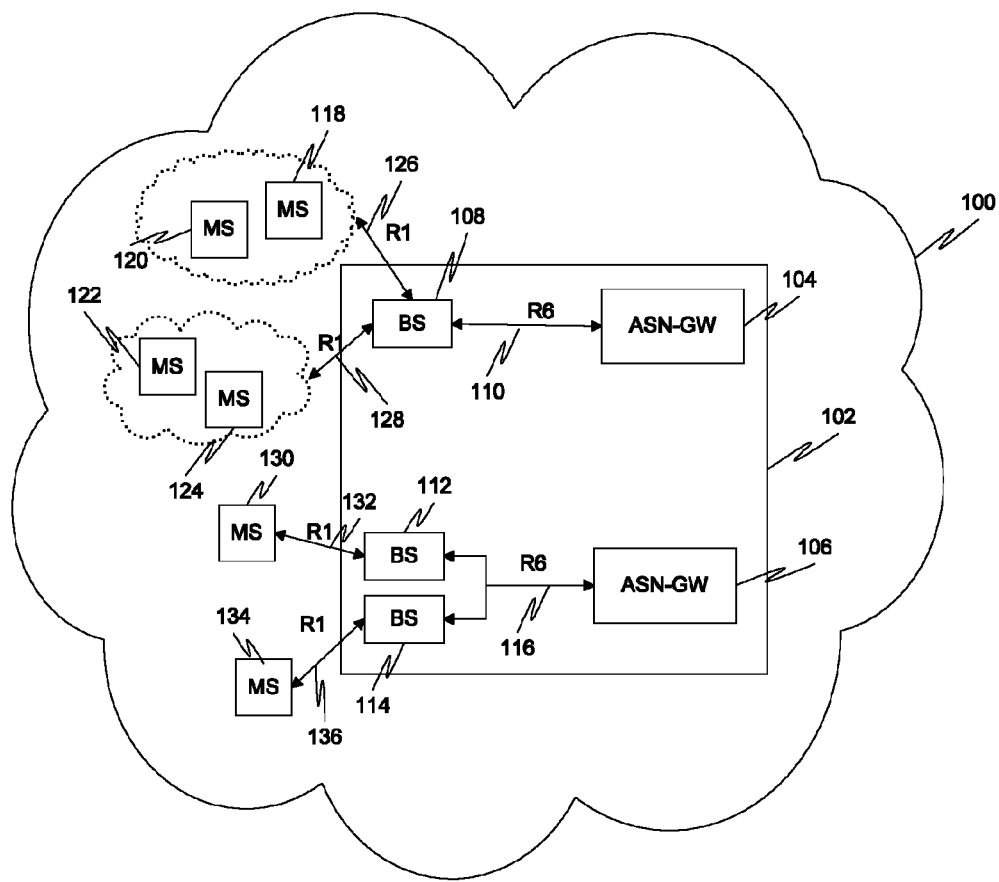
FIG. 1 is a block diagram showing a communication network (that is exemplary) in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to managing communication in a communication network. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and apparatus for managing communication in a communication network. Examples of the communication network may include, but are not limited to, Worldwide Interoperability for Microwave Access (WiMAX) communication network, 3rd Generation Partnership Project (3GPP) network including 3GPP Long Term Evolution (LTE) network, 3rd Generation Partnership Project 2 (3GPP2) network including 3GPP2 Ultra Mobile Broadband (UMB) network, Wireless Fidelity (WiFi) network, and any variant of Orthogonal Frequency Division Multiple Access (OFDMA) communication network having a backhaul link.

In the communication network, traffic information is obtained from a Base Station (BS). The BS is connected to a backhaul link for availing communication services over wireless connectivity and providing the services to a plurality of Mobile Stations (MSs). The traffic information of the BS corresponds to a traffic condition over one or more interfaces between the BS and the plurality of MSs communicating with the BS. Thereafter, traffic in the backhaul link is controlled based on the traffic information obtained from the BS.

FIG. 1 is block diagram showing a communication network 100 (that is exemplary) in which various embodiments of the invention may function. In an embodiment of the invention, communication network 100 is a WiMAX communication network 100. WiMAX communication network 100 includes an Access Service Network (ASN) 102. It will be apparent to a person skilled in the art that WiMAX communication network 100 may include more than one ASN. ASN 102 includes an ASN-Gateway (GW) 104 and an ASN-GW 106. ASN-GW 104 communicates with a BS 108 through an R6 link 110. R6 link 110 is a backhaul link and is used for providing Internet Protocol (IP) connectivity to BS 108. Similarly, ASN-GW 106 communicates with a BS 112 and a BS 114 through an R6 link 116. It will be apparent to a person skilled in the art that ASN 102 may include more than two ASN-GWs and each ASN-GW may communicate with more than two BSs. Additionally, an ASN-GW may use a plurality of R6 links for communicating with a number of BSs. The number of R6 links used by the ASN-GW may be equal to the number of BSs communicating with the ASN-GW.

Further, BS 108 provides communication services to Mobile Stations (MSs) in a first sector and a second sector of a cell of BS 108. Examples of a MS may include one of, but are not limited to a laptop, a computer, a Personal Digital Assistant (PDA), and a hand-held device. A subscriber uses a MS to avail communication services over wireless connectivity through a corresponding BS. In the first sector, BS 108 communicates with a MS 118 and a MS 120 through an R1 link 126. Additionally, in the second sector, BS 108 communicates with a MS 122 and a MS 124 through an R1 link 128. Similarly, BS 112 communicates with a MS 130 through an R1 link 132 and BS 114 communicates with a MS 134 through an R1 link 136. An R6 link connecting an ASN-GW and a BS may include a plurality of virtual sub-channels. The number of virtual sub-channels is equal to the number of interfaces used by the BS for communicating with a group of MSs. For example, R6 link 110 includes a first virtual sub-channel corresponding to R1 link 126 and a second virtual sub-channel corresponding to R1 link 128.

Figure 2:
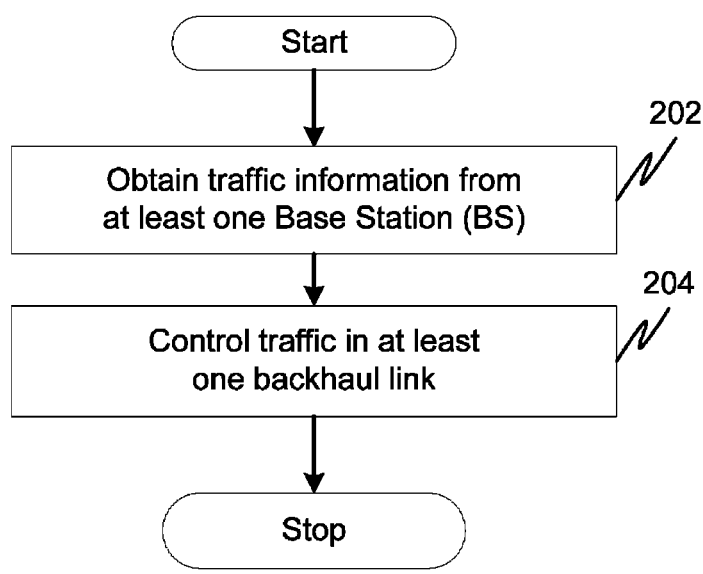
FIG. 2 is a flowchart of a method of managing communication in a communication network, in accordance with an embodiment of the invention.

FIG. 2 is a flowchart of a method of communication in a communication network, in accordance with an embodiment of the invention. Traffic information is obtained from one or more BSs at 202. One or more BSs use one or more backhaul links for availing communication services over wireless connectivity and providing the communication services to one or more MSs. In an embodiment of the invention, a communication network is a WiMAX communication network and a backhaul link is an R6 link. The backhaul link connects one or more BSs with an ASN-GW. In another embodiment of the invention, the backhaul link connects one or more BSs with a controller. The traffic information of a BS corresponds to a traffic condition over one or more interfaces between the BS and one or more MSs communicating with the BS. The traffic condition over an interface between a BS and MSs communicating with the BS may vary due to change in capacity of the BS. The capacity of the BS may vary due to change in modulation rate of signals transmitted over the interface between the BS and the MSs. Generally, the modulation rate of the signals is changed depending on the wireless channel conditions. For instance, the modulation rate is increased if the wireless channel condition is good.

By way of an example, when the modulation rate of signals transmitted between a BS and a group of MSs changes from 64 Quadrature Amplitude Modulation (QAM) to Quadrature Phase-Shift Keying (QPSK), the capacity of the BS is reduced to ⅓ of its actual capacity.

A BS may use a single interface to communicate with each MS in the cell of the BS. Alternatively, the cell of the BS may be divided into a plurality of sectors. In this case, the BS uses an interface for communicating with a group of MSs in a sector. Therefore, the BS uses more than one interface to communicate with MSs in the cell of the BS. For example, BS 108 uses R1 link 126 to communicate with MS 118 and MS 120 in one sector. Similarly, R1 link 128 is used for communicating with MS 122 and MS 124 in another sector of BS 108. In this example, traffic information of BS 108 corresponds to the traffic condition over R1 link 126 and R1 link 128.

For each interface used by a BS to communicate with MS, a backhaul link of the BS includes one or more virtual sub-channels. Therefore, the number of virtual sub-channels in a backhaul link corresponds to the number of interfaces used by the respective BS. For example, R6 link 110 includes two virtual sub-channels as BS 108 uses two R1 links, i.e., R1 link 126 and R1 link 128.

Based on the traffic information obtained from one or more BSs, traffic in one or more backhaul links is controlled at 204. Traffic in a backhaul link is controlled by adjusting the traffic in one or more virtual sub-channels of the backhaul link. The traffic in one or more virtual sub-channels of the backhaul link is adjusted based on the traffic condition over the interfaces corresponding to one or more virtual sub-channels of the backhaul link. The traffic may be adjusted by distributing the total allocated bandwidth of the backhaul link among one or more virtual sub-channels of the backhaul link based on the traffic condition over the corresponding interfaces. For instance, traffic or capacity in R1 link 126 is more, whereas the traffic or capacity is comparatively lesser in R1 link 128. Information regarding the traffic in R1 link 126 and R1 link 128 is obtained from BS 108 by ASN-GW 104. Thereafter, the ASN-GW controls the traffic in R6 link by adjusting the traffic in a first virtual sub-channel that corresponds to R1 link 126 and a second virtual sub-channel that corresponds to R1 link 128. To achieve this, ASN-GW 104 allocates a part of the bandwidth of the second virtual sub-channel to carry additional data intended for R1 link 126 to the first virtual sub-channel.

This way an operator can operate the backhaul link below the required capacity. A backhaul link of less capacity can be used, while avoiding congestion in the communication network by appropriately scheduling traffic in the backhaul link. Therefore, operational cost can be reduced considerably.

By way of another example, ASN-GW 106 communicates with BS 112 and BS 116 through R6 link 116. Further, BS 112 communicates with MS 130 through R1 link 132. Similarly, BS 114 communicates with MS 134 through R1 link 136. Therefore, R6 link 116 has a first virtual sub-channel corresponding to R1 link 132 and a second virtual sub-channel corresponding to R1 link 136. Traffic in the first virtual sub-channel and the second virtual sub-channel of R6 link is adjusted based on the traffic condition over R1 link 132 and R1 link 134.

Figure 3:
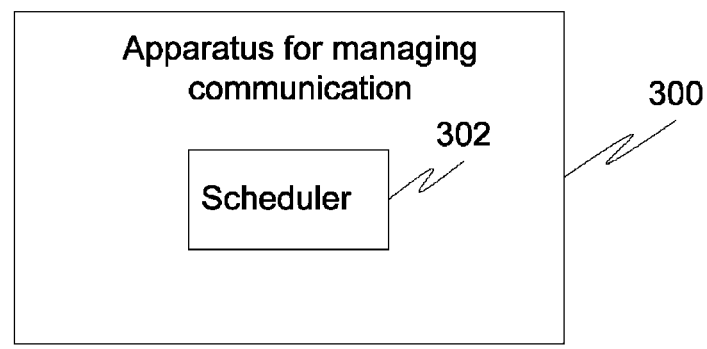
FIG. 3 is a block diagram of an apparatus for managing communication in a communication network, in accordance with an embodiment of the invention.

FIG. 3 is a block diagram of an apparatus 300 for managing communication in a communication network, in accordance with an embodiment of the invention. In an embodiment of the invention, apparatus 300 is a controller. In another embodiment of the invention, apparatus 300 for managing communication is an ASN-GW.

Apparatus 300 communicates with one or more BSs through one or more backhaul links for availing communication services over wireless connectivity and providing the communication services to a plurality of MSs. Apparatus 300 includes a scheduler 302. Scheduler 302 obtains traffic information from one or more BSs communicating with apparatus 300. Traffic information of a BS corresponds to a traffic condition over one or more interfaces between the BS and a plurality of MSs communicating with the BS. In an embodiment of the invention, an interface between the BS and MSs communicating with the BS is an R1 link. A cell of a BS may be divided into a plurality of sectors. In such case, the BS uses an interface for communicating with a group of MSs in a sector. Therefore, the BS uses more than one interface to communicate with MSs in the cell of the BS.

For each interface used by a BS to communicate with MS, a backhaul link of the BS includes one or more virtual sub-channels. Therefore, the number of virtual sub-channels in a backhaul link corresponds to the number of interfaces used by the respective BS.

Based on the traffic information obtained from one or more BSs, scheduler 302 controls traffic in one or more backhaul links. Additionally, for controlling traffic in a backhaul link, scheduler 302 adjusts the traffic in one or more virtual sub-channels of the backhaul link based on the traffic condition over the interfaces corresponding to one or more virtual sub-channels. Consequently, scheduler 302 distributes the total allocated bandwidth of the backhaul link among one or more virtual sub-channels of the backhaul link based on the traffic condition over the corresponding interfaces. This has been explained in conjunction with FIG. 2.

Figure 4:
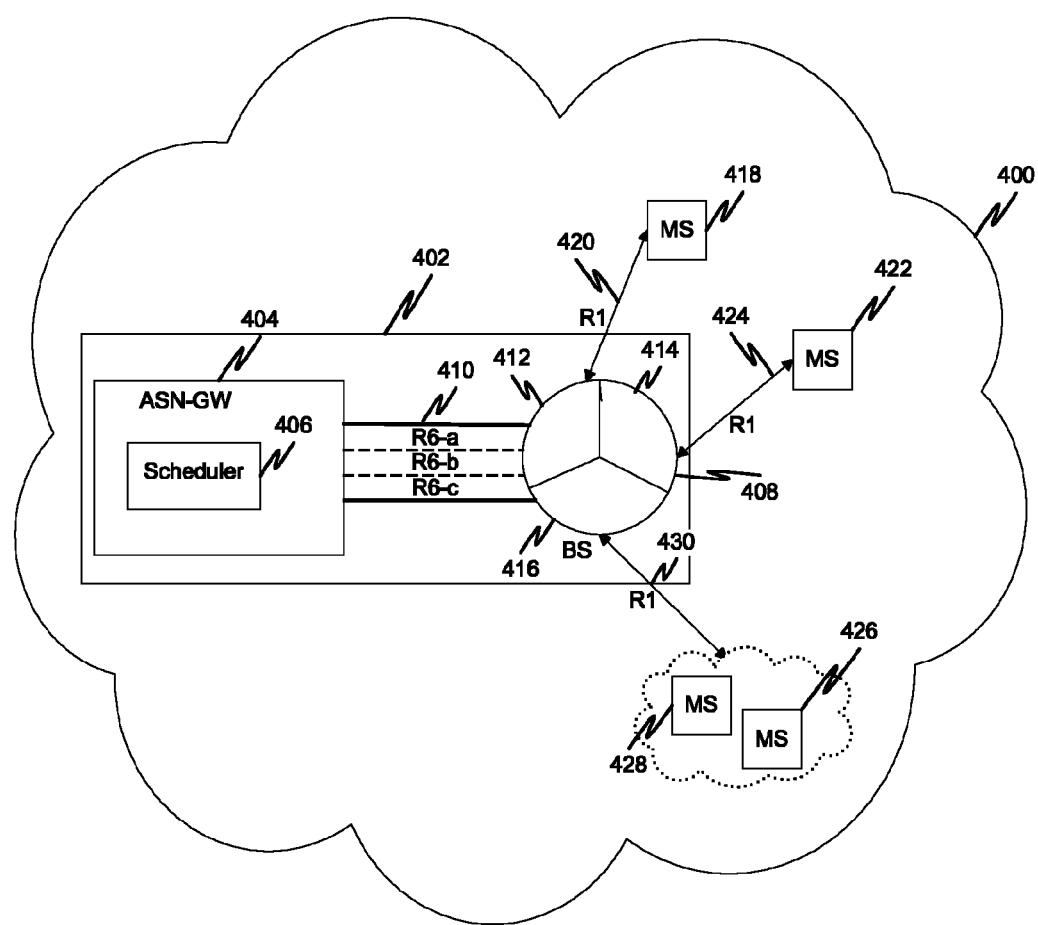
FIG. 4 is a block diagram illustrating a method of managing communication in a WiMAX communication network, in accordance with an exemplary embodiment of the invention.

FIG. 4 is a block diagram illustrating a method of communication in a WiMAX communication network 400, in accordance with an exemplary embodiment of the invention. WiMAX communication network 400 includes an ASN 402 which further includes an ASN-GW 404. It will be apparent to a person skilled in the art that WiMAX communication network 400 may include more than one ASN and ASN 402 may include more than one ASN-GW.

ASN-GW 404 communicates with a BS 408 through a backhaul link 410. Backhaul link 410 may be an R6 link. BS 408 provides communication services to MSs in three sectors, i.e., a sector 412, a sector 414, and a sector 416. In sector 412, BS 408 communicates with MS 418 through an R1 link 420. Additionally, in sector 414, BS 408 communicates with MS 422 through an R1 link 424. Similarly, BS 408 communicates with MS 426 and MS 428 in sector 416 through an R1 link 430. A scheduler 406 in ASN-GW 404 obtains traffic information from BS 408. The traffic information corresponds to traffic condition over R1 link 420, R1 link 424 and, R1 link 430.

For R1 link 420 of BS 408, backhaul link 410 includes a virtual sub-channel R6-a. Similarly, for R1 link 424, backhaul link 410 includes a virtual sub-channel R6-b. In addition, a virtual sub-channel R6-c is provided in backhaul link 410 corresponding to R1 link 430. The capacities of each of sector 412, sector 414 and sector 416 of BS 408 is 'c', therefore the total capacity of BS 408 is '3 c'.

Traffic condition over R1 link 420, R1 link 424, and R1 link 430 varies due to change in capacity of sector 412, sector 414, and sector 416 of BS 408. The change in capacity of BS 408 is due to change in modulation rate of signals transmitted over R1 link 420, R1 link 424, and R1 link 428.

In an example, sector 412 of BS 408 operates below its capacity 'c', that is, it has less traffic than the maximum amount of traffic it can handle. Similarly, sector 414 of BS 408 also operates below its capacity 'c' However, sector 416 operates at the maximum capacity, i.e., 'c'. Scheduler 406 controls traffic in backhaul link 410 based on the traffic information obtained from BS 408.

Scheduler 406 adjusts the traffic by distributing the total allocated bandwidth of backhaul link 410 among its three virtual sub-channels based on the traffic condition over R1 link 420, R1 link 424, and R1 link 430. More specifically, scheduler 406 allocates one or more parts of bandwidths of virtual sub-channel R6-a and virtual sub-channel R6-b to virtual sub-channel R6-c, thereby avoiding clogging of virtual sub-channel R6-c. In this case, actual capacity of BS 408 is '3 c'; however, an operator can lease only '2.5 c' for backhaul link 410 and can operate the WiMAX communication network 400 without any congestion by intelligently scheduling the traffic by scheduler 406 based on the traffic information obtained from BS 408.

Various embodiments of the invention provide a method and apparatus for managing communication in a communication network. The method controls traffic in backhaul link based on traffic information obtained from BS. The traffic information corresponds to traffic condition over an interface between the BS and a plurality of MSs communicating with the BS. The traffic condition over the interface between the BS and the MSs varies due to change in capacity of the BS. The change in capacity of BS is due to change in modulation rate of signals transmitted between the BS and the MSs.

As the scheduler controls the traffic in the backhaul link, based on the traffic information obtained from the BS, an operator can operate the backhaul link below the actual capacity of the BS, which is less costly. This reduces the operational expenses of the operators and still provides high quality of service. Further, data dropout and loss at the BS can be prevented by intelligently distributing total allocated bandwidth of a backhaul link among its virtual sub-channels based on traffic condition over the corresponding interfaces of the BS.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing communications in a communication network, the method comprising:
   obtaining traffic information from at least one Base Station (BS), the traffic information from the at least one BS corresponding to a traffic condition over at least one interface between the at least one BS and a plurality of Mobile Stations (MSs) communicating with the at least one BS; and controlling allocation of bandwidth in at least one backhaul link based on the traffic information obtained from the at least one BS.

2. The method of claim 1, wherein the communication network is one of a Worldwide Interoperability for Microwave Access (WiMAX) communication network, 3rd Generation Partnership Project (3GPP) Long Term Evolution (LTE) network, 3rd Generation Partnership Project 2 (3GPP2) Ultra Mobile Broadband (UMB) network, Wireless Fidelity (WiFi) network, and a variant of Orthogonal Frequency Division Multiple Access (OFDMA) communication network.

3. The method of claim 1 further comprising supporting communications between the at least one BS and a controller via the at least one backhaul link.

4. The method of claim 1, further comprising supporting communications between the at least one BS and an Access Service Network-Gateway (ASN-GW) in a WiMAX communication network via the at least one backhaul link.

5. The method of claim 1 using an interface to communicate between the at least one BS and a group of MSs in a sector of the at least one BS, the plurality of MSs including the group of MSs.

6. The method of claim 1 further comprising employing at least one virtual sub-channel in the backhaul link, the number of virtual sub-channels in the backhaul link corresponding to the number of interfaces used by the at least one BS.

7. The method of claim 6, wherein controlling the allocation of bandwidth in the at least one backhaul link further includes adjusting the allocation of bandwidth in the at least one virtual sub-channel of the backhaul link based on the traffic condition over interfaces corresponding to the at least one virtual sub-channel.

8. The method of claim 7, wherein adjusting the allocation of bandwidth in the at least one backhaul link further includes distributing the total allocated bandwidth of the backhaul link among the at least one virtual sub-channel of the backhaul link based on the traffic condition over interfaces corresponding to the at least one virtual sub-channel.

9. The method of claim 1, wherein an interface between the at least one BS and the plurality of MSs communicating with the at least one BS is an R1 link.

10. The method of claim 1, wherein the at least one backhaul link is an R6 link.

11. The method of claim 1, further comprising enabling the traffic condition over the at least one interface between the at least one BS and the plurality of MSs communicating with the at least one BS to vary due to change in capacity of the at least one BS.

12. The method of claim 11, wherein the change in capacity of the at least one BS is due to change in modulation rate of signals transmitted over the interface.

13. The method of claim 1, wherein controlling the allocation of bandwidth in the at least one backhaul link further includes distributing the total allocated bandwidth of the backhaul link among at least one virtual sub-channel of the backhaul link.

14. The method of claim 13 wherein distributing the total allocated bandwidth of the backhaul link among the at least one virtual sub-channel of the backhaul link is based on the traffic condition over interfaces corresponding to the at least one virtual sub-channel.

* * * * *